(12) United States Patent
Hamilton et al.

(10) Patent No.: US 7,011,445 B1
(45) Date of Patent: Mar. 14, 2006

(54) MAXIMUM/MINIMUM THERMOMETER

(75) Inventors: John Montgomery Hamilton, Carlisle (GB); Peter Graham Perkins, Crieff (GB)

(73) Assignee: S. Brannan & Sons, Ltd., Cumbria (GB)

( * ) Notice: Subject to any disclaimer, the term of this patent is extended or adjusted under 35 U.S.C. 154(b) by 0 days.

(21) Appl. No.: 09/936,387

(22) PCT Filed: Mar. 7, 2000

(86) PCT No.: PCT/GB00/00833

§ 371 (c)(1),
(2), (4) Date: Dec. 18, 2001

(87) PCT Pub. No.: WO00/54014

PCT Pub. Date: Sep. 14, 2000

(30) Foreign Application Priority Data

Mar. 9, 1999 (GB) .................................. 9905216

(51) Int. Cl.
*G01K 5/12* (2006.01)
*G01K 5/08* (2006.01)
*G01K 5/20* (2006.01)
*G01K 1/06* (2006.01)

(52) U.S. Cl. .................... 374/201; 374/202; 374/208; 116/216

(58) Field of Classification Search ............ 374/201, 374/202, 208, 190, 161–162, 156; 116/216, 116/186, 187
See application file for complete search history.

(56) References Cited

U.S. PATENT DOCUMENTS

| | | | | |
|---|---|---|---|---|
| 483,365 | A | * 9/1892 | Rapkin et al. | 374/190 |
| 498,651 | A | * 5/1893 | Hicks | 374/190 |
| 1,942,857 | A | * 1/1934 | Hickman | 374/190 |
| 2,043,583 | A | * 6/1936 | Hubbard | 374/193 |
| 2,102,678 | A | * 12/1937 | Campbell | 374/190 |
| 2,370,968 | A | * 3/1945 | Kahl | 374/156 |
| 2,930,234 | A | * 3/1960 | Harada | 374/190 |
| 3,631,721 | A | * 1/1972 | Nollen et al. | 73/368.3 |
| 3,688,582 | A | * 9/1972 | Gradishar | 73/371 |
| 3,726,141 | A | * 4/1973 | Bremer | 374/202 |
| 3,849,622 | A | * 11/1974 | Merriam | 219/713 |
| 3,915,006 | A | * 10/1975 | Ayres | 73/371 |
| 3,961,530 | A | * 6/1976 | Helgesson | 73/339 R |
| 4,229,976 | A | * 10/1980 | Jones | 73/371 |
| 4,457,253 | A | * 7/1984 | Manske | 116/216 |

(Continued)

FOREIGN PATENT DOCUMENTS

DE 0015490 * 9/1881 .................. 374/190

(Continued)

OTHER PUBLICATIONS

International Search Report corresponding to PCT/GB00/00833; Date of mailing: May 10, 2000.

*Primary Examiner*—Gail Verbitsky
(74) *Attorney, Agent, or Firm*—Myers Bigel Sibley & Sajovec, PA

(57) ABSTRACT

This invention relates to maximum/minimum thermometer of the type comprising an expansion liquid, a transfer liquid and indexes for recording the maximum and minimum temperatures. Described in particular are new transfer liquids designed to replace conventionally used mercury and new indexes suitable for use in the disclosed thermometers.

17 Claims, 2 Drawing Sheets

U.S. PATENT DOCUMENTS

Figure 1:
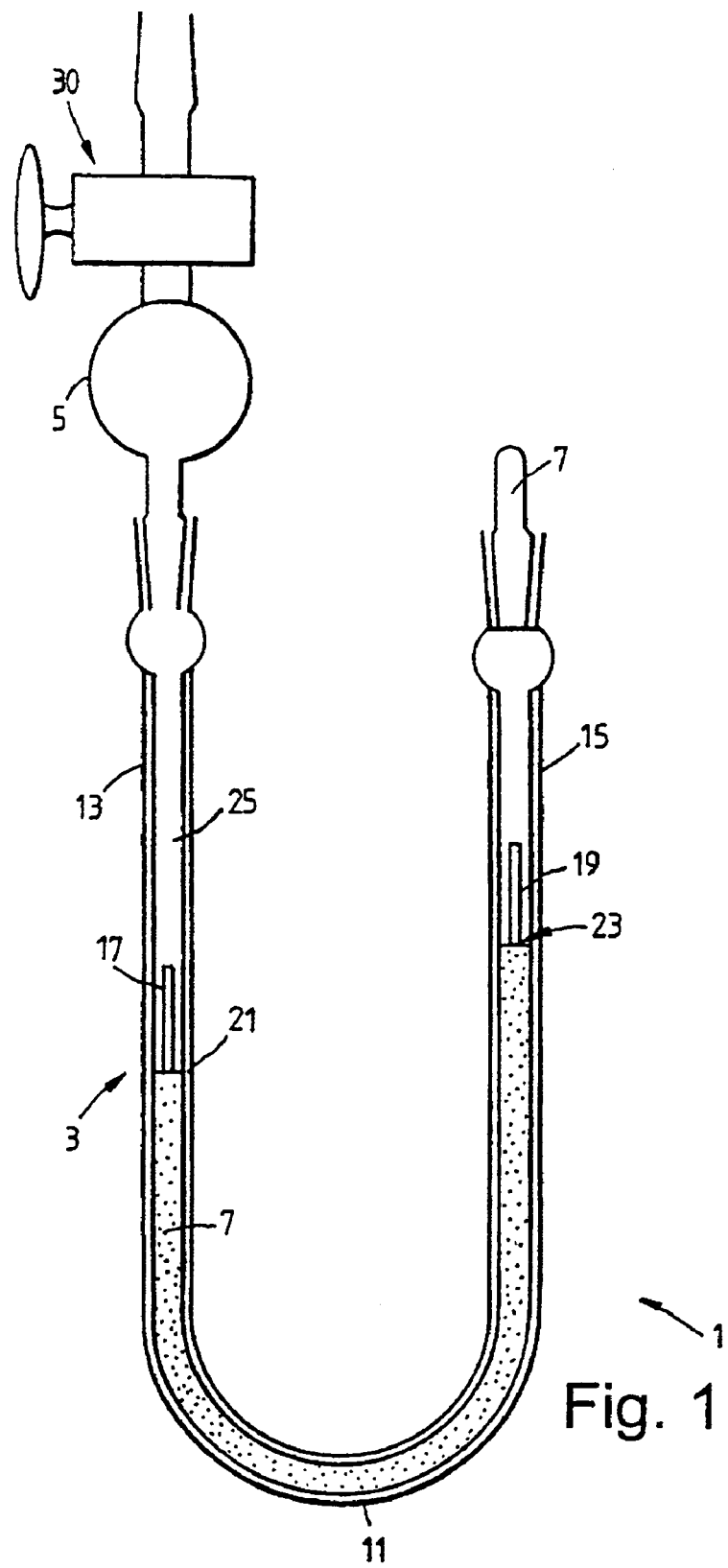

| | | | |
|---|---|---|---|
| 4,627,741 A | 12/1986 | Faller | 374/104 |
| 4,655,609 A * | 4/1987 | Alber | 374/194 |
| 4,968,153 A * | 11/1990 | Stachoviak | 374/189 |
| 5,215,378 A * | 6/1993 | Manske | 374/105 |
| 5,404,834 A * | 4/1995 | Murphy | 116/216 |
| 5,609,418 A * | 3/1997 | Black | 374/159 |
| 5,800,060 A * | 9/1998 | Speckbrock et al. | 374/104 |
| 5,990,199 A * | 11/1999 | Bealing | 523/161 |
| 6,403,131 B1 * | 6/2002 | Carmon | 426/233 |
| 2002/0185279 A1 * | 12/2002 | Blair et al. | 166/335 |

FOREIGN PATENT DOCUMENTS

| | | | | |
|---|---|---|---|---|
| DE | 2552385 A | * | 5/1977 | |
| DE | 3838620 A | * | 6/1989 | |
| GB | 001967/041882 | * | 4/1967 | 374/190 |
| GB | 1470971 A | * | 4/1977 | |

\* cited by examiner

MAXIMUM/MINIMUM THERMOMETER

This application claims priority from Great Britain Application No. 9905216.9 filed Mar. 9, 1999 and PCT Application No. PCT/GB00/00833, filed Mar. 7, 2000, both in English, the disclosures of which are incorporated by reference herein in their entirety.

This invention relates to maximum/minimum thermometers.

Maximum/minimum thermometers are well known in the art and date back some two hundred years. For example that of J. Six (1731–1793) was described by him to the Royal Society in 1782.

U.S. Pat. No. 4,627,741 discloses a typical maximum/minimum thermometer which has an improved index recovery mechanism.

As will be appreciated maximum/minimum thermometers such as described in U.S. Pat. No. 4,627,741 are often constructed from a U-shaped liquid containing tube in which mercury metal is provided in the bend of the U-section and extends into the two legs of the U-tube. The mercury serves as a so-called "transfer liquid".

In addition to the mercury, the U-tube contains an expansion liquid which contacts the mercury, and is immiscible therewith. Movement of the mercury is effected by the expansion or contraction of the expansion liquid in response to changes in temperature.

Also provided are two temperature display indexes or pins contained within the U-shaped tube. In use the indexes are initially positioned so they contact and float at the surface of the mercury. Upon advancement of a mercury front, the index in contact with the advancing mercury front is moved along within the U-tube.

The indexes may be described as unidirectional devices since upon retreat of the mercury front from the index, the index retains its position in the U-tube typically by virtue of a restraining method. For example one method of restraint is provided by a magnetic attractive force between the index and a magnetic strip placed adjacent to the U-tube.

An alternative index restraining method may be provided by a frictional force between the inner wall of the U-tube and a sprung glass hair attached to the index.

By using two indexes, one at each front of the mercury, the recordal of the temperature at each extreme end of a temperature range is thus possible. One index will accord a position which represents the maximum temperature, and the other index will accord a position representing the minimum temperature observed over a particular time interval. Temperature markings are provided on a graduated scale positioned adjacent to the U-tube allowing the maximum and minimum temperatures to be read directly.

Currently however, the transfer liquid of choice is mercury metal because of its suitable physical properties such as its high density, (i.e. 13.6 gcm$^{-3}$) and its immiscibility with many expansion liquids. Moreover mercury metal also remains liquid, over a wide temperature range (ie. mercury has a melting point of –38.9° C. and a boiling point of 356.6° C.), making it suitable for use in many maximum/minimum thermometer applications.

Notwithstanding the aforementioned suitable characteristics of mercury it is apparent, because of current heightened environmental awareness, that use of mercury in thermometers is undesirable. For instance mercury is highly toxic. Thus, mercury requires special handling and disposal procedures should spillage occur, for example through thermometer breakage. Moreover, mercury is also relatively expensive.

It is among the objects of the present invention to obviate or at least mitigate one or more of the aforementioned problems associated with thermometers which employ mercury as a transfer liquid.

It is an object of the present invention to provide a maximum/minimum thermometer comprising a transfer liquid which is substantially or more preferably entirely mercury free.

According to a first aspect of the present invention there is provided a maximum/minimum thermometer comprising an expansion liquid which expands or contracts in response to changes in temperature, a transfer liquid which is substantially immiscible with the expansion liquid, and two indexes capable of being moved through action of the transfer or expansion liquid, wherein the transfer liquid is mercury free.

It is understood that the term "transfer liquid" refers to the liquid within a maximum/minimum thermometer which is moved in response to the thermal expansion/contraction of the expansion liquid, and the purpose of which is to assist in identifying the maximum and minimum temperatures over a particular time period, by providing a means for moving the indexes to positions indicative of the maximum and minimum temperatures.

The maximum/minimum thermometer may be of a typical U-tube design wherein the transfer liquid is positioned within the bend of the U-tube, extending into each leg thereof. In use, the indexes initially rest at each front of the transfer liquid. The maximum and minimum temperatures may be read off a temperature scale associated with the U-tube from the final resting positions of the indexes.

It is generally understood that the transfer liquid should have the following properties:
i) be immiscible with the expansion liquid;
ii) remain substantially in a mobile liquid state at and between the upper and lower temperature limits of the thermometer in use; and
iii) have a density which is different from that of the expansion liquid.

To ensure that the transfer liquid remains in the liquid state within any particular temperature range, the skilled addressee will appreciate that the contents of the U-tube may be pressurised accordingly. For example for any particular transfer liquid an increase in pressure will enable the liquid state to exist at higher temperatures.

Desirably the transfer liquid may also have:
low thermal expansivity;
display low toxicity; and
be coloured or be capable of being coloured.

Depending on any particular application the skilled addressee may choose any suitable combination or all of the above-mentioned desirable properties in addition to the generally essential properties i), ii) and iii).

Typically the transfer liquid will have a density greater than the expansion liquid. Thus, for example, if a U-shaped maximum/minimum thermometer is used in an upright position, that is, with the legs of the U-tube directed upwards, the transfer liquid will rest below the expansion liquid traversing the bend in the U-tube and extending into the two legs. However, it should be understood that maximum/minimum thermometers may be designed which rest sideways, rather than in the upright position, or maybe of other shapes.

It will be appreciated that for a thermometer which is to be used in an upright position the choice of transfer liquid may be determined by the density of the expansion liquid being used. For example if toluene (density 0.87 g.cm$^{-3}$), a typical expansion liquid, is used, the transfer liquid will have a density greater than 0.87 g.cm$^{-3}$.

Maximum/minimum thermometers are often used to measure a maximum/minimum air temperature for example in a greenhouse. Thus, the transfer liquid should preferably remain substantially liquid up to and above the highest expected temperature. Therefore, the transfer liquid will generally be required to remain substantially liquid up to and above 50° C., more preferably above 70° C. It will be appreciated however that the choice of transfer liquid will ultimately depend on the application the maximum/minimum thermometer is being put to. Consequently the transfer liquid may be chosen for thermometer use at much higher temperatures for instance above 150° C.

Conversely the transfer liquid should preferably remain substantially liquid at a temperature which is below that of the lowest temperature expected to be encountered when using a maximum/minimum thermometer. Thus, for example, for outside use the substantially liquid state of the transfer liquid should be maintained preferably below −30° C., more preferably below −50° C.

The skilled addressee will appreciate that environmental ambient temperature changes generally occur slowly, and therefore this allows for a viscous transfer liquid to be used if necessary. A viscous liquid, although being mobile, will move relatively slowly. Alternatively, the transfer liquid may not be completely homogeneous, that is, it may contain suspended solid particles or droplets of liquid; such a transfer liquid may be colloidal.

Preferably the transfer liquid displays low thermal expansion. Thus, although an expansion liquid expands/contracts in response to temperature changes, it is preferable that the transfer liquid displays a low degree of expansion/contraction in response to temperature changes. However, if the transfer liquid does display a certain degree of thermal expansion this may be taken account of by appropriate design of the temperature scale. Such a design may be a non-linear temperature scale.

Since the transfer liquid is moved within the U-tube by expansion/contraction of the expansion liquid, the transfer liquid must be substantially immiscible with the expansion liquid and/or display substantially no chemical interaction with the expansion liquid.

It is also desirable that the transfer liquid display low toxicity, or at least be considered less toxic than mercury.

Although it is the indexes which generally serve to identify the maximum and minimum temperatures, it is preferable aesthetically that the transfer liquid is coloured or is capable of being coloured so that it may easily be seen in the thermometer. Typically the transfer liquid may be coloured by the addition of suitable dyes. Depending on the transfer liquid being used suitable dyes may include Eurocert Green S or water-soluble salts of inorganic complex ions such as the tetra-ammino copper (II) ion or the hexacyanatoferrate ion. Naturally, the skilled addressee may envisage the use of other suitable dyes.

A suitable dye may be chosen for its preferential solubility of the dye in the transfer liquid as compared to its non-solubility in the expansion liquid.

Examples of suitable transfer liquids which possess at least some of the aforementioned preferred properties include solutions comprising inorganic or organometallic compounds, for example solutions of compounds of elements found in groups III, IV, V, VI and VII of the periodic table (see table 1 below) or mixtures thereof, as well as organic liquids, such as members of the halogenoparaffin series of compounds.

TABLE 1

| Group | Possible Compounds |
| --- | --- |
| III | Halides of boron |
| IV | Halogen derivatives of silane and disilane, Mixed silicon halides and organo-halides, Many possible compounds derived from stannane substituted with halogens and alkyl groups. Organolead compounds. Titanium tetrachloride |
| V | Pure and mixed halides and organohalides of phosphorus. Halogen substituted derivatives or arsine and stibine |
| VI | Sulphur halides, some selenium and tellurium halides |
| VII | Some interhalogen compounds |

Additionally, a recent revival of interest in molten salt chemistry has led to the exploration and development of low-melting ionic liquids. These are salt mixtures which are liquid at room temperature and examples exist which are liquid down to −90° C. A number of possible systems already exist and many more can be envisaged. Most current knowledge relates to binary systems containing the compounds aluminium trichloride, phosphorous pentafluoride, and boron trifluoride. When mixed with quaternary ammonium salts in which the substituents may be paraffin chains of various lengths, a range of liquid results. In such salts the quaternisable nitrogen atoms may be in rings such as pyridine or imidazole rings.

As examples it is possible to produce a series of such low-melting liquids by combining 1-alkyl-3-methyl imidazolium chloride with boron trifluoride via metathesis of the chloride of the former with sodium tetrafluoroborate.

It is envisaged that liquids having densities in the useful range mentioned in other sections of this patent can by synthesised. The melts are of low toxicity and may be coloured with standard organic dyes. Certain of the liquids may be employed in the present invention as transfer liquids along with certain of the expansion liquids chosen from those mentioned herein.

A particularly preferred transfer liquid is a solution comprising ionic compounds, typically a solution comprising at least one alkaline earth or alkali metal salt.

The solution may be an aqueous solution in which said at least one alkaline earth and/or alkali metal salt is dissolved. The solution may however comprise an organic liquid, such as an alcohol, ketone, ether or mixtures thereof.

Alkaline earth and/or alkaline metal salts are particularly preferred because of their high solubilities in water. For example it is possible to make aqueous solutions in which the amount of alkaline earth and/or alkali metal salt is between 80% and 400% w/v, for example between 100% to 200% w/v.

Dissolution of the alkaline earth and/or alkali metal salt in water lowers the freezing point below 0° C. The degree of freezing point lowering will depend on the molecular weight of the solute, its percentage concentration in solution, and the number of ions into which it dissociates in aqueous solution. Each "particle" in the solution contributes separately to the freezing point lowering (the Van't Hoff i-factor). This makes alkaline earth and/or alkali metal salts very efficient in lowering the freezing point. Using solids of such high solubility it is possible to lower the freezing point of a concentrated aqueous solution to −40° C. to −50° C.

Such salt solutions comprising high percentages of alkaline earth and/or alkali metal salts also have densities greater than water. For example calcium bromide solutions of 110% w/v, 120% w/v and 125% w/v have densities of 1.62, 1.66 and 1.68 g.cm$^{-3}$ respectively. The temperature at which solid precipitates from each of the solutions, either by freezing or deposit of solute is around −51° C.

Salt solutions such as those described herein also boil above 100° C. since the dissolved substance also raises the boiling point of water in accordance with Raoult's Law. This makes the substances eminently suitable for use as the transfer liquid since the boiling point is substantially above that of the highest temperature on a typical maximum/minimum thermometer scale.

Moreover these aqueous salt solutions are likely to have only limited self-expansion since the salt is present as ions. The expansivity will, therefore, be similar to that of water itself which, in turn, is only a little more than mercury and about a fifth that of toluene, a common thermometer expansion liquid.

If the transfer liquid is water-based there will be an interface interaction only with other liquids with which water is miscible or reacts directly. Such liquids are generally inorganic or are oxygenated organic compounds, e.g. alcohols, ketones, phenols, or, possibly, organohalogen compounds. This means that there is a range of other organic liquids which may be used as the expansion liquid, for example hydrocarbons such as toluene, xylenes, kerosene, gasoline, or their mixtures.

Additionally, dissolved alkaline earth or alkali metal salts have varying levels of toxicity but a number are essentially non-toxic and, because of the high boiling points of the solutions, have low vapour pressure. Accidental breaking of the thermometer would not, therefore, constitute a hazard and any residue could readily be flushed away with water.

Generally the alkaline earth or alkali metal salt may be selected from such compounds as halides (for example fluorides, chlorides, bromides, iodides), sulphates, hydroxides, carbonates, chlorates, dichromates, chromates, carboxylates (for example acetates), nitrates, nitrites, phosphates, ammonium compounds or other salts comprising an alkaline earth or alkali metal ion and a cationic species.

Suitable examples of metal salts which may be used are $CaI_2$, $CaBr_2$, $CsBr$, $CsF$, $CsOH$, $Cs_2SO_4$, $CH_3COOCs$, $KF.2H_2O$, $HCOOK$, $KI$, $KNO_2$, $RbF$, $NaClO_4.H_2O$, $Na_2Cr_2O_7.2H_2O$ or $NaI.2H_2O$.

Particularly preferred salts are selected from alkaline earth metal halides, such as $CaI_2$ and $CaBr_2$.

Generally speaking solutions of the above-mentioned salts are colourless or only weakly self-coloured. However, colourants may be readily introduced by the use of water-soluble, non-toxic dyestuffs during preparation.

It will be appreciated that the same properties may also be achieved using mixtures of the aforementioned salts in which there is no mutual reaction.

It may also be possible to employ a high-density organic compound as transfer liquid. These are almost exclusively halogenated compounds and certain of them are toxic. If such an organic material were used, however, the nature of the expansion liquid would have to be changed to suit the interface (ie. be immiscible). Furthermore, since organic liquids generally have a high thermal expansivity, a significant correction to one side of the thermometer scale would be necessary. Mixtures of organic liquids would also be feasible and would be governed by the same principles.

Preferably however the transfer liquid will have a low thermal expansivity compared to the expansion liquid. Nevertheless to account for any small changes in volume in the transfer liquid the temperature scale of the thermometer may be graduated in a non-linear fashion so as to correct any errors which would otherwise occur if the temperature scale was linear.

The present invention also in a further aspect provides the use of solutions as described herein as transfer liquids in maximum/minimum thermometers.

Desirably the expansion liquid should possess:
i) high thermal expansivity;
ii) be substantially immiscible with the transfer liquid;
iii) remain substantially in a mobile liquid state at and between the upper and lower temperature limits of the thermometer; and
iv) have a density which is different to that of the transfer liquid.

Given the above specifications, a hydrocarbon or a mixture of hydrocarbons may be used as the expansion liquid should the transfer liquid be an aqueous solution. Hydrocarbons are sharply separable from water and can be mixed readily with organohalogen compounds in order to raise the density smoothly.

Hydrocarbons, such as toluene, the xylenes, kerosene, gasoline, or their mixtures and a variety of other organic compounds could be used either alone or in admixture depending on the system chosen. These are cheap, readily available, and often of low toxicity. If the transfer liquid were itself organic then a different choice of expansion liquid would be necessary. An alternative choice for this role in the latter case could be a hydroxylated/oxygenated organic compound such as an alcohol, ether, ketone, or ester or a mixture of these.

The indexes must be designed to function appropriately with the chosen transfer liquid and expansion liquid. Preferably the indexes should be chemically and physically stable towards both the transfer and expansion liquids.

Generally speaking the indexes will have a density less than that of the transfer liquid and be able to float at the surface of the transfer liquid. Such indexes are therefore moved by action of the transfer liquid. The indexes may be magnetic or rendered magnetic such that it is possible for a magnet or magnets placed adjacent or near to thermometer to hold the indexes in position. Retention of an index by the magnet occurs after retreat of the transfer liquid from said index.

For example it is possible to construct a glass-based index for the thermometer by forming a glass tube with very thin walls and inserting a small piece of ferrous wire. The overall density of the index can be pre-determined by judiciously combining the density contributions of glass, wire, and the air contained in the tube.

A suitable index may be fabricated by using a low-density tubular plastic material (e.g. low or high-density polyethylene, polypropylene or other material having density in the region of 1.0 gm.cm$^{-3}$) containing a piece of ferrous metal. As for the glass-based index above the dimensional parameters i.e length, diameter, and wall thickness can be varied to produce an overall index having suitable density. The expansion liquid density can then be tuned to that of the index for buoyancy; an appropriate index may have density in the region of 1.0 gm.cm$^{-3}$.

A third type of solid index can be constructed by first synthesising a plastic with intrinsic magnetic properties. This may be done by mixing and/or melting together the chosen plastic or its components with a quantity of a magnetic powder such as iron filings, magnetite ($Fe_3O_4$), strontium ferrite, or other magnetic powders. The amounts of each component may be adjusted to provide suitable magnetic strength whilst preserving a low density e.g 10–15% of magnetite with polypropylene produces a plastic of density 0.98–1.02 gm.cm$^{-3}$. This plastic is initially produced as a solid mass and then may be melted, extruded, or pulled out to give a fine fibre. This is then chopped to afford magnetic plastic indices. Density adjustment of the expansion liquid to suit the index density must then be carried out.

The magnets for use with a maximum/minimum thermometer comprising magnetic indexes generally lie behind the tube legs and the transfer liquid must be able to push the indexes along whilst they are in the magnetic field yet leave them "fixed" in position when the transfer liquid retreats. The former is generally achieved via buoyancy adjustment of the expansion liquid in a way which makes it possible to move the index along by only a small "push" of the transfer liquid. For the same reason, only a small magnetic attraction is required to hold the index in place when the transfer liquid retreats.

It should be appreciated however that other indexes such as the type using a spring glass hair mentioned in the introduction or other frictional devices may also be used. Moreover, if the U-tube is used in a horizontal position, the indexes may not require frictional or magnetic features. The indexes have to be able to be pushed along by the transfer liquid and may be reset by tilting the thermometer upright and allowing the indexes to return into contact with the surface of the transfer liquid.

As mentioned above, the density of the index should generally be less than that of the transfer liquid so that the index will rest at the surface of the transfer liquid. However, fluid statics dictates that there will be a partial sinking of the index in the higher density surface to a depth determined by the relative densities of the two. This is generally aesthetically undesirable in a maximum/minimum thermometer but may be avoided by raising the density of the expansion liquid appropriately. This may be done by mixing into the principal expansion liquid an amount of a higher-density liquid. For example if toluene (density $0.87$ gm.cm$^{-3}$) is used as the main component of the expansion liquid, bromobenzene (density $1.491$ gm.cm$^{-3}$) or 1,3-dibromopropane (density $1.989$ gm.cm$^{-3}$) may be added. This increases the buoyancy of the expansion liquid and allows the index to rest on the surface of the transfer liquid.

The maximum/minimum thermometers described herein are generally formed from glass. However, suitable plastics material may also be used.

It has been observed that the transfer liquid may not move completely freely within the thermometer and may in some instances tend to stick to the glass. As such it may be desirable to add a friction reducing agent, such as a surfactant, to the transfer liquid.

Figure 2:
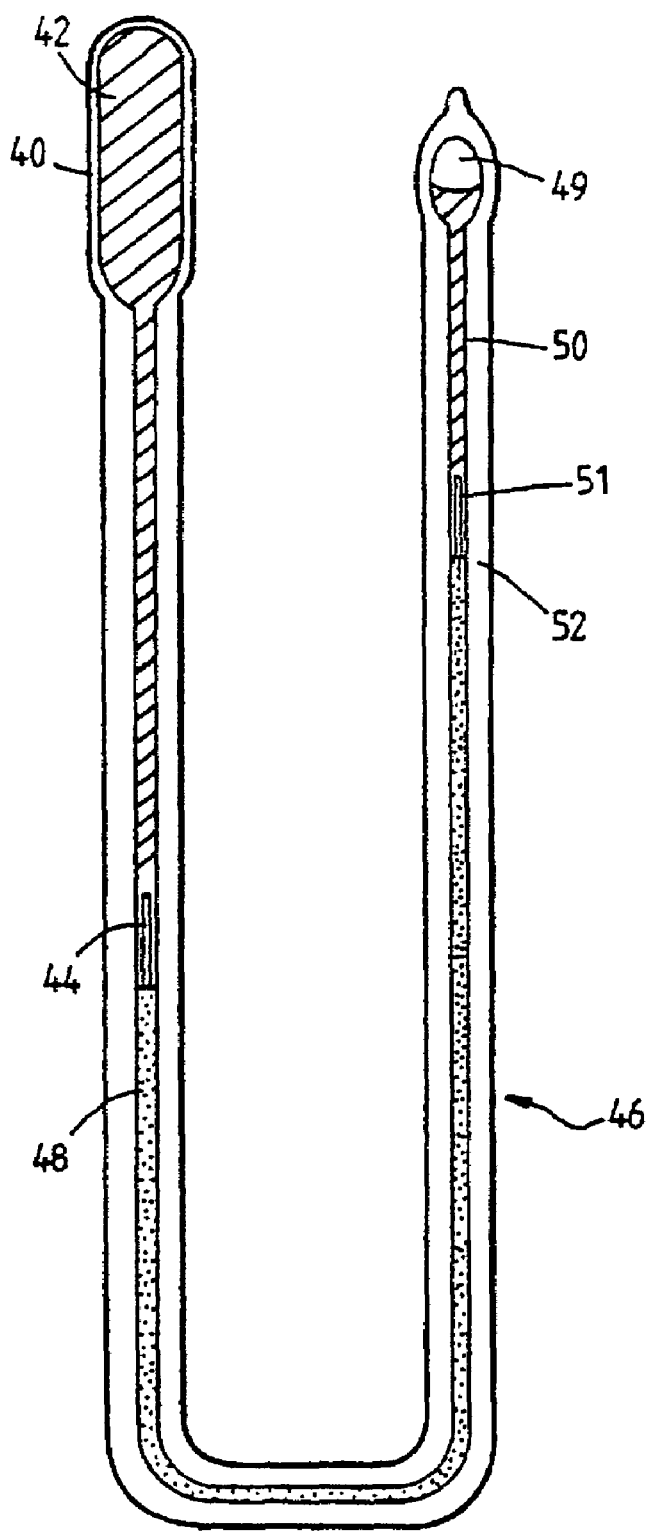

The present invention will be further understood with reference to the following detailed description of "test apparatus" showing the underlying principles of the present invention and with reference to FIGS. 1 and 2, which shows such "test apparatus".

A maximum/minimum thermometer test apparatus (1) shown in FIG. 1 has been constructed to demonstrate the principles given and to allow experimentation with both transfer and expansion liquids and with various index types. The apparatus (1) is of a U-shaped tube (3) design. The bore of the U-tube is 5 mm. and has at its two ends a reservoir bulb (5) (ca. 6 ml. capacity) and a stopper (7) which are removable for cleaning and re-filling.

In this example the U-tube (3) is partially filled with a transfer liquid (9) which is a 120% w/v solution in water of calcium bromide. As can be seen, with the U-tube (3) in an upright orientation, the calcium bromide solution (9) fills the bend (11) of the U-tube (3) and extends into each leg (13, 15) of the U-tube (3). The calcium bromide solution (9) can be tinted suitably with any water-soluble dyestuff, in this case, Eurocert Green S at a level of ca. 0.05% by weight.

Two indexes (17, 19) are inserted within the U-tube (3) and rest at the two fronts (21, 23) of the calcium bromide solution (9). The two indexes (17, 19) are made from polypropylene tubing (diameter 2.3 mm., bore 0.4 mm. and length 20 mm.). A piece of iron wire (thickness 0.1 mm, and length 5 mm.) is placed inside each index (17, 19) and the ends sealed by heating and flattening. This produces an index with density near 1 gm.cm$^{-3}$.

The indexes (17, 19) have been "balanced" in the expansion liquid (25) i.e the density of the expansion liquid (25) has been adjusted to give buoyancy to the indexes (17, 19) so that each index (17, 19) can be raised in the limb against a magnetic field provided by magnets (not shown) by movement of the transfer liquid (9). In this example the expansion liquid (25) is mainly toluene and, in the balancing process 1,3-dibromopropane has been added drop by drop to raise the density of this liquid suitably.

A small quantity of expansion liquid (9) has been added to leg (15) of the U-tube (3) so as to cover index (19) and the stopper (7) fitted. The reservoir bulb (5) has been fitted, and the whole leg (13) and reservoir bulb (5) filled fully with expansion liquid (25) using a syringe, and the tap (30) closed.

It will be appreciated that this "test apparatus" is useful for illustrating the viability of all the principles mentioned herein.

The "test apparatus" described above has been tested at temperature between 13.0° C. and 60.0° C. using full immersion in a water bath and was observed to function appropriately.

In addition to the aforementioned features magnets are used to hold the indexes (17, 19) in position once moved by the transfer liquid (9). The magnets are positioned behind each leg (13, 15) of the U-tube (3) and their distance from the U-tube (3) adjusted in order to allow the indexes (17, 19) to function correctly.

The skilled addressee will understand that in use a temperature scale (not shown) is also provided behind the U-tube (3) so that the maximum and minimum temperatures may be read from the positions of the two indexes (17, 19) in the U-tube (3).

A more detailed "test apparatus", similar to a commercial maximum/minimum thermometer has also been constructed, details of which are given below:

Normal Thermometric glass is cut into suitable lengths.

An automatic process draws the glass and blows an expansion cavity as shown (FIG. 2). The cavity is left open. A second automatic process heats the opposite end of the stem and by application of filtered air through the open ended cavity, the thermometer bulb (40) is formed.

The straight thermometer is now filled with toluene (expansion fluid) (42) in a vacuum filling process.

A reading index (44) (see specification below) is inserted into the thermometer bore and allowed to sink to the bulb (40).

An automatic process, expels the surplus toluene (42) with the bulb (40) above ambient temperature and continues to heat and bend the thermometer (46) into a U-shape.

The bore is then filled with dyed calcium bromide (transfer liquid—see specification below) (48) care being taken to deposit the calcium bromide on the surface of the toluene.

The U-shaped thermometer (46) is now inverted with bulb (40) being held above ambient temperature and surplus calcium bromide (48) is drawn off to a pre-specified distance from the base of the U-bend.

The bore and expansion cavity (49) are then manually filled with toluene (50).

A reading index (51) is inserted into the cavity and allowed to drop onto the calcium bromide surface (52).

The thermometer is then cooled below ambient and the expansion cavity (49), (which also contains air due to the contraction of the liquids used in the bore), is quickly sealed. This allows for compression of the air in the event of the thermometer being heated to a level outside its maximum working temperature.

1. Specification for Reading Index a) Formulation
   Polypropylene PP BFC 1012 Nat:100 gms
   Magnetite C1312B (Avocado): 36 pph Polypropylene b) Compounding
   Materials compounded in torque Rheometer at 180° C. for 8 minutes and granulated using Christy Noris granulator.

c) Strand Extrusion
   Extrudate production is achieved using a Carter/Beher Acer 2000 capillary Rheometer, fitted with a capillary die of suitable length and diameter to produce and index of appropriate dimensions to suit the bore of the thermometer.

d) Extrusion
   The extrudate is drawn and cut using a linked Gillard 350/30-1800 bench cutter to appropriate lengths.
   Density of each index approximately 1.15 g/cm$^3$.

2. Specification of Transfer Liquid
   Formulation
   120 gm $CaBr_2.xH_2O$
   38 ml Supercook Green Colouring
   62 ml $H_2O$
   0.027 ml CF 32 (Rohn & Haas) surfactant
   Density approximately 1.6 g/cm$^3$.

The U-tube shown in FIG. 2 is then mounted onto a suitable frame, behind which, is placed (on each limb) a strip magnet running along the length of the limb. These magnets retain the reading index in the position of maximum and minimum temperature, to which the transfer liquid menisci have raised them.

What is claimed is:

1. A reusable maximum/minimum thermometer comprising
   an expansion liquid (42) which expands or contracts in response to changes in temperature,
   a transfer liquid (48) which is moved in response to the expansion or contraction of the expansion liquid and which is substantially immiscible with the expansion liquid,
   two indexes (44, 51), and
   a temperature scale associated with the maximum/minimum thermometer, wherein the indexes are constructed from a plastic material into which has been mixed and/or melted a quantity of magnetic powder such as iron filings, magnetite ($Fe_3O_4$), and/or strontium ferrite, and wherein the indexes have a density less than that of the transfer liquid, are able to float on the surface of the transfer liquid, and are moved by the transfer liquid into resting positions whereby maximum and minimum temperatures are read off the temperature scale, and
   wherein the transfer liquid is a mercury free solution selected from the group consisting of inorganic compounds, organometallic compounds, organic liquids, and ionic liquids.

2. The maximum/minimum thermometer according to claim 1 wherein the transfer liquid has a density which is different from that of the expansion liquid.

3. The maximum/minimum thermometer according to claim 2 wherein the transfer liquid has a density greater than that of the expansion liquid.

4. The maximum/minimum thermometer according to claim 3 wherein the transfer liquid has a density greater than 0.87 g. cm$^{-3}$.

5. The maximum/minimum thermometer according to claim 1 wherein the transfer liquid remains substantially liquid at least between −30° C. and +50° C.

6. The maximum/minimum thermometer according to claim 1 wherein the transfer liquid further displays a low thermal expansivity; a low toxicity; and/or is coloured or capable of being coloured.

7. The maximum/minimum thermometer according to claim 6 wherein the transfer liquid is capable of being coloured by a suitable dye.

8. The maximum/minimum thermometer according to claim 7 wherein the dye is selected from Aniline Blue, Eurocert Green S or water soluble salts of inorganic complex ions such as the tetra-ammino copper (II) ion or the hexacyanatoferrate ion.

9. The maximum/minimum thermometer according to claim 1 wherein the transfer liquid is a solution comprising inorganic or organometallic compounds of elements found in groups III, IV, V, VI and VII of the periodic table, or mixtures thereof.

10. The maximum/minimum thermometer according to claim 9 wherein the compounds are halogen containing compounds.

11. The maximum/minimum thermometer according to claim 1 wherein the transfer liquid is a solution comprising ionic compounds.

12. The maximum/minimum thermometer according to claim 11 wherein the transfer liquid is a solution comprising at least one alkaline earth and/or alkali metal salt.

13. The maximum/minimum thermometer according to claim 12 wherein the solution is an aqueous solution in which said at least one alkaline earth and/or alkali metal salt is dissolved.

14. The maximum/minimum thermometer according to claim 13 wherein the aqueous solution comprises an amount of alkaline earth and/or alkali metal salt from between 80% and 400% w/v.

15. The maximum/minimum thermometer according to claim 14 wherein the alkaline earth or alkali metal salt is selected from halides, sulphates, hydroxides, carbonates, chlorates, dichromates, chromates, carboxylates, nitrates, nitrites, phosphates, ammonium compounds or other salts comprising an alkaline earth or alkali metal ion and a cationic species.

16. The maximum/minimum thermometer according to claim 15 wherein the alkali earth or alkali metal salt is selected from $CaI_2$, $CaBr_2$, CsBr, CsF, CsOH, $Cs_2SO_4$, $CH_3COOC_s$, $KF.2H_2O$, HCOOK, KI, $KNO_2$, RbF, $NaClO_4.H_2O$, $Na_2Cr_2O_7 2H_2O$ and $NaI.2H_2O$.

17. The maximum/minimum thermometer according to claim 1 wherein the expansion liquid comprises a hydrocarbon or mixtures of hydrocarbon.

* * * * *